(12) United States Patent
Stark et al.

(10) Patent No.: US 10,167,992 B2
(45) Date of Patent: Jan. 1, 2019

(54) DOME CAMERA MECHANISM

(71) Applicant: Avigilon Corporation, Vancouver (CA)

(72) Inventors: Andrew Joseph Stark, Vancouver (CA); Christopher James Cullington Okrainetz, Vancouver (CA); Nigel Geoffrey Taylor, Maple Ridge (CA)

(73) Assignee: Avigilon Corporation, Vancouver (CA)

( * ) Notice: Subject to any disclaimer, the term of this patent is extended or adjusted under 35 U.S.C. 154(b) by 0 days.

(21) Appl. No.: 15/614,934

(22) Filed: Jun. 6, 2017

(65) Prior Publication Data

US 2018/0031175 A1 Feb. 1, 2018

Related U.S. Application Data

(60) Provisional application No. 62/367,577, filed on Jul. 27, 2016.

(51) Int. Cl.
| | | |
|---|---|---|
| *G03B 13/00* | (2006.01) | |
| *F16M 11/12* | (2006.01) | |
| *G03B 17/02* | (2006.01) | |
| *F16M 11/14* | (2006.01) | |
| *G08B 13/196* | (2006.01) | |
| *F16M 11/18* | (2006.01) | |
| *G03B 17/00* | (2006.01) | |

(52) U.S. Cl.
CPC .......... *F16M 11/123* (2013.01); *F16M 11/14* (2013.01); *G03B 17/02* (2013.01); *F16M 11/12* (2013.01); *F16M 11/18* (2013.01); *G03B 17/00* (2013.01); *G08B 13/1963* (2013.01); *G08B 13/19619* (2013.01); *G08B 13/19632* (2013.01)

(58) Field of Classification Search
CPC .................................................. G08B 13/1963
USPC .......................................................... 396/427
See application file for complete search history.

(56) References Cited

U.S. PATENT DOCUMENTS

| | | | | |
|---|---|---|---|---|
| 5,223,872 A * | 6/1993 | Stiepel | ............. | G08B 13/19619 348/143 |
| 5,394,209 A * | 2/1995 | Stiepel | ............. | G08B 13/19619 348/151 |
| 5,503,040 A * | 4/1996 | Wright | .................... | B64C 13/04 244/236 |
| 5,905,923 A * | 5/1999 | Chitsaz | .................. | F16C 33/26 248/183.3 |
| 6,262,768 B1 * | 7/2001 | Williams | ................ | H04N 7/181 348/151 |
| 7,658,555 B1 * | 2/2010 | Moilanen | ................ | G01C 21/18 348/373 |
| 2007/0019330 A1 * | 1/2007 | Wolfersberger | ......... | H01Q 3/08 360/244 |
| 2013/0051778 A1 * | 2/2013 | Dimotakis | ............. | B64D 47/08 396/12 |

(Continued)

FOREIGN PATENT DOCUMENTS

| | | | |
|---|---|---|---|
| DE | 20 2004 012 185 U1 | 11/2004 | |
| EP | 0 043 405 B1 | 7/1985 | |

(Continued)

*Primary Examiner* — Clayton E Laballe
*Assistant Examiner* — Kevin Butler
(74) *Attorney, Agent, or Firm* — Daniel Hammond

(57) ABSTRACT

A dome camera mechanism for an improved gimbal pan assembly which stops further rotation of an optical module of the dome camera in a pan direction using a cam latch.

12 Claims, 19 Drawing Sheets

(56) References Cited

U.S. PATENT DOCUMENTS

2013/0287385 A1\* 10/2013 Andersson ........... H04N 5/2252
　　　　　　　　　　　　　　　　　　　　396/427
2017/0205686 A1\* 7/2017 Bingleman ............ G03B 17/55

FOREIGN PATENT DOCUMENTS

| FR | 2 692 832 A1 | 12/1993 |
| FR | 2 712 226 A1 | 5/1995 |

\* cited by examiner

DOME CAMERA MECHANISM

RELATED U.S. APPLICATION DATA

The present application claims the benefit of priority of provisional application No. 62/367,577 filed on Jul. 27, 2016, the entire contents of which are hereby incorporated by reference.

FIELD

The present subject-matter relates to a camera device, and more particularly to a domed camera device having an improved optical module pan rotation mechanism.

BACKGROUND

Dome cameras are widely used in various applications for capturing images of a scene. One particular application exists in the field of surveillance. The dome of the camera advantageously protects components of the camera from outside particles and liquids. Furthermore, the dome can assist in concealing the orientation of the lens of the camera. This concealment reduces the feeling of intrusion for people present near the camera. Typically, the optical module of a dome camera is pan, rotated and tilted to aim the optical module in a direction for a desired field of view.

Typically the camera module is able to be tilted between zero and ninety degrees. The tilting mechanism is simple for such short adjustments. However, the optical module in a domed camera has to allow panning for at least 360 degrees in order to ensure full coverage, but not much more than 360 degrees in order to ensure that the wires connecting to the optical module are not stressed by the twisting as a result of the optical module being pan rotated.

A yoke 1920 in accordance with the prior art is shown in FIG. 19. The yoke 1920 includes a first arm 1925 and a second arm 1930. The first arm 1925 has a first draft surface 1935 and the second arm 1930 has a second draft surface 1940. The yoke 1920 has the two arms 1925, 1930 that extend outwards for some distance and then extend upwards. The upwards extending parts are the draft surfaces 1935, 1940 each containing pass-throughs for screw bosses which acts as an axle for tilt rotation of an optical module, and track slots wherein a locking thumb screw rides. One locking thumb screw is sufficient to lock the yoke 1920 from tilt rotating, but two locking thumb screws may also be used, one on each draft surface 1935, 1940.

To manufacture this yoke 1920 part, the pass-throughs are created by a slider in a mold tool, where the exterior surface on the yoke 1920 is normal to movement of the slider direction 1945. The inside surface is created on the core (core direction 1950) of the tool, this necessitates a draft 1955 on the inside surface of each arm 1925, 1930 of the yoke 1920 to allow the part to be removed from the tool. The draft 1955 is, for example, a 1.5 degree angle on the inside surface of the draft surfaces 1935, 1940 to make the inside surfaces of the yoke 1920 angled slight outward from the vertical, while leaving the exterior surfaces of the draft surfaces 1935, 1940 parallel to each other. The draft 1955 creates a non-uniform thickness for the clamping action of the locking thumb screw, but which may too easily allow the optical module to tilt in one direction with little force.

SUMMARY

According to one example embodiment, there is provided a gimbal pan assembly for locking an optical module of a dome camera in a pan direction. The gimbal pan assembly includes a yoke configured to mount the optical module. The yoke includes a disk. The gimbal pan assembly includes a gimbal base configured to: mount the yoke; and allow the yoke to pan rotate. The gimbal base also includes a cam latch mounted on the gimbal base and configured to push against the disk to create friction to lock the yoke from pan rotating.

According to another example embodiment, there is provided a gimbal pan assembly for locking an optical module of a dome camera in a pan direction. The gimbal pan assembly includes a yoke configured to mount the optical module. The yoke includes a disk. The gimbal pan assembly also includes a gimbal base having a tab and configured to: mount the yoke; and allow the yoke to pan rotate. The gimbal pan assembly also includes a cam latch mounted on the gimbal base and configured to push the tab against the disk to create friction to lock the yoke from pan rotating.

BRIEF DESCRIPTION OF THE DRAWINGS

The detailed description refers to the following figures, in which.

Figure 1:
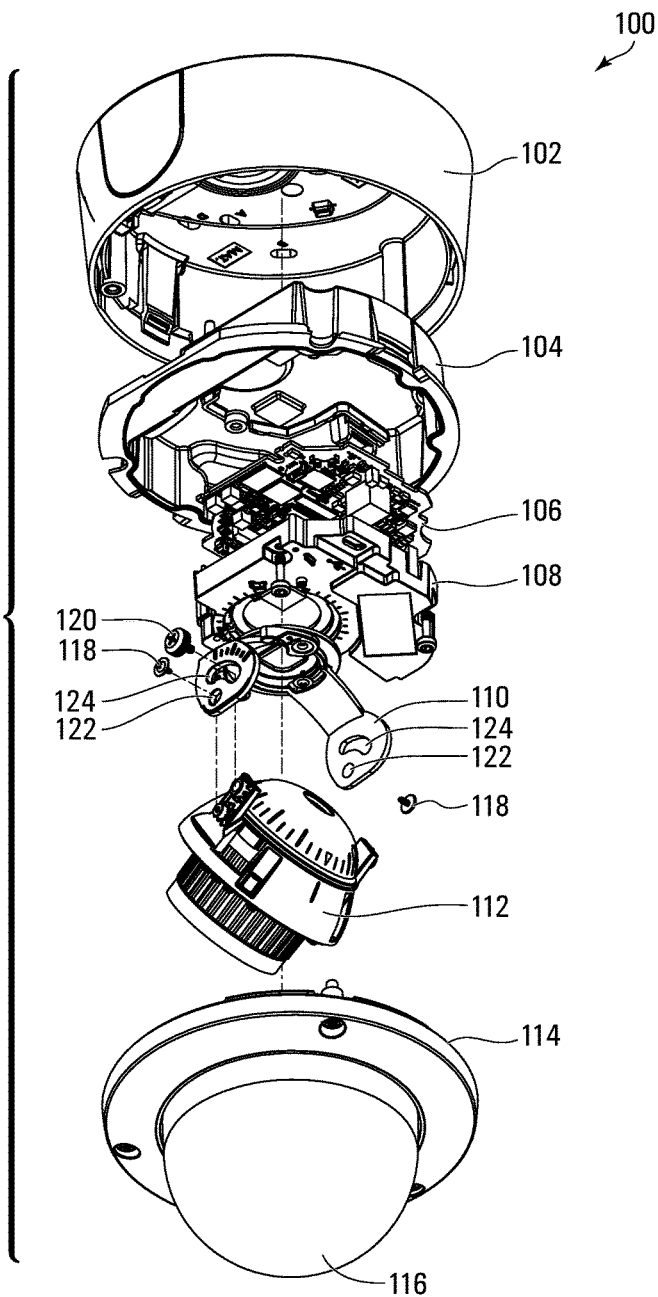
FIG. 1 illustrates an exploded perspective view of a dome camera according to one example embodiment.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "approximately" or "substantially" as used herein mean a reasonable amount of deviation of the modified term such that the end result is not significantly changed. These terms of degree should be construed as including a deviation of at least ±10% of the modified term if this deviation would not negate the meaning of the word it modifies.

Referring now to FIG. 1, illustrated therein is is an exploded perspective view of a dome camera 100 according to one example embodiment. The dome camera 100 comprises a surface mount adapter 102, a housing 104, an electronics board 106, a gimbal base 108, a yoke 110, an optical module 112, and a dome bubble assembly 114. The dome camera 100 may be installed on a ceiling with the dome bubble assembly 114 pointing downwards. The dome camera 100 may also be installed on a pendant with the dome bubble assembly 114 again pointing downwards. The dome camera 100 may also be installed on a wall with the dome bubble assembly 114 pointing sideways.

The optical module 112 tilts approximately from zero to 90 and pan rotates more than 360 degree in order to ensure that the dome camera 100 may be set to a desired field of view.

The dome camera 100 further has wiring (not shown) to connect the optical module 112 to the electronic board 106 where images, including video, captured by the optical module 112 are processed before being sent onwards to a security system (not shown) either through more wiring (not shown) or wirelessly (not shown). The processing may include formatting the outputted image data to various image standards such as, for example, H.264 and further may include analyzing the images using video analytics to detect objects and to classify the objects. The processing may further include compressing, encoding, and decoding the captured images and video.

The optical module 112 includes a lens unit, an image sensor (not shown), and the associated circuitry (not shown). The lens unit is located at a front end of the optical module 112. The optical module 112 captures images and video of a scene in the field of view of the dome camera 100. The dome bubble assembly 114 has a dome part 116 which allows light external to the dome camera 100 to pass the dome part 116 which is then captured by the optical module 112 to form the images and video. The image sensor may be CMOS, NMOS or CCD.

The electronics board 106 may further include data management functions for storing the captured images and video locally and for transmitting the same over a network to other devices as part of the security system. The electronics board 106 may further include communication and control functions for the security system to control the optical module 112 as is known in the field.

Figure 2:
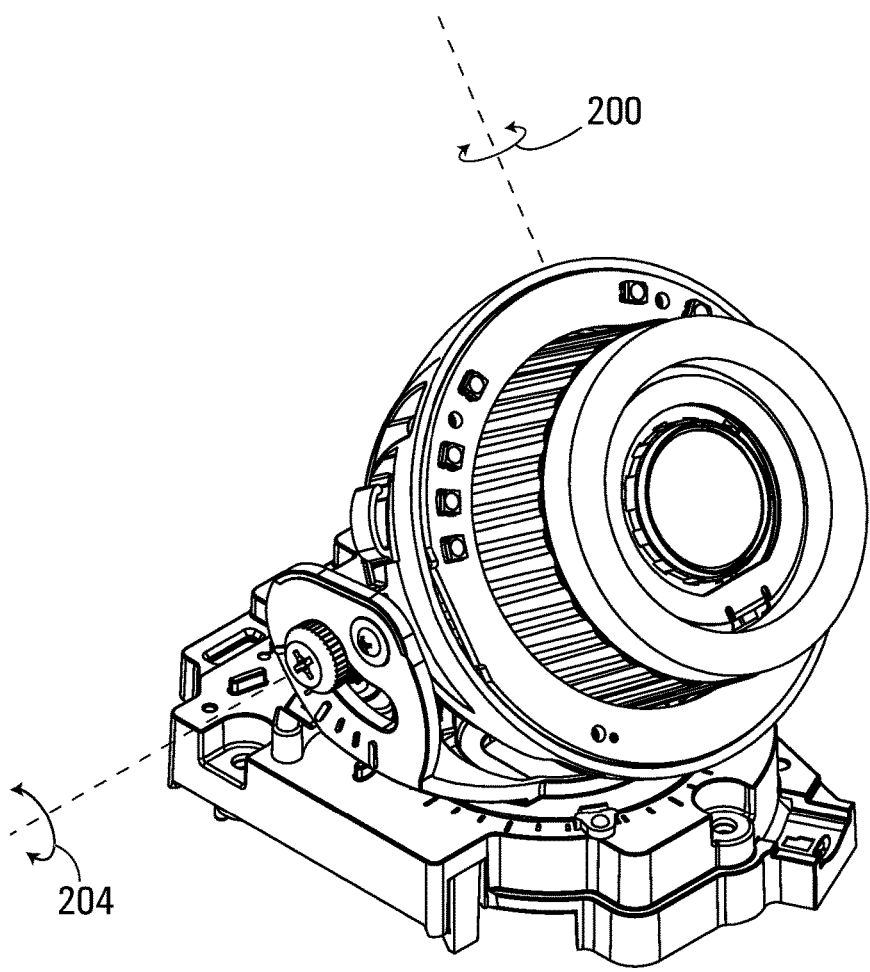
FIG. 2 illustrates a perspective view of the optical module, the yoke, and the gimbal base assembled according to one example embodiment.

Referring now to FIG. 2, illustrated therein is is a perspective view of the optical module 112, the yoke 110, and the gimbal base 108 assembled according to one example embodiment. The yoke 110 pan rotates around a first axis 200 relative to the gimbal base 108 for over 360 degrees. The optical module 112 tilts or rotates related to the yoke 110 around a second axis 204 approximately zero to 90 degrees from near the first axis 200 to a plane near the gimbal base 108. The first axis 200 and the second axis 204 are approximately orthogonal or perpendicular to each other.

Figure 3:
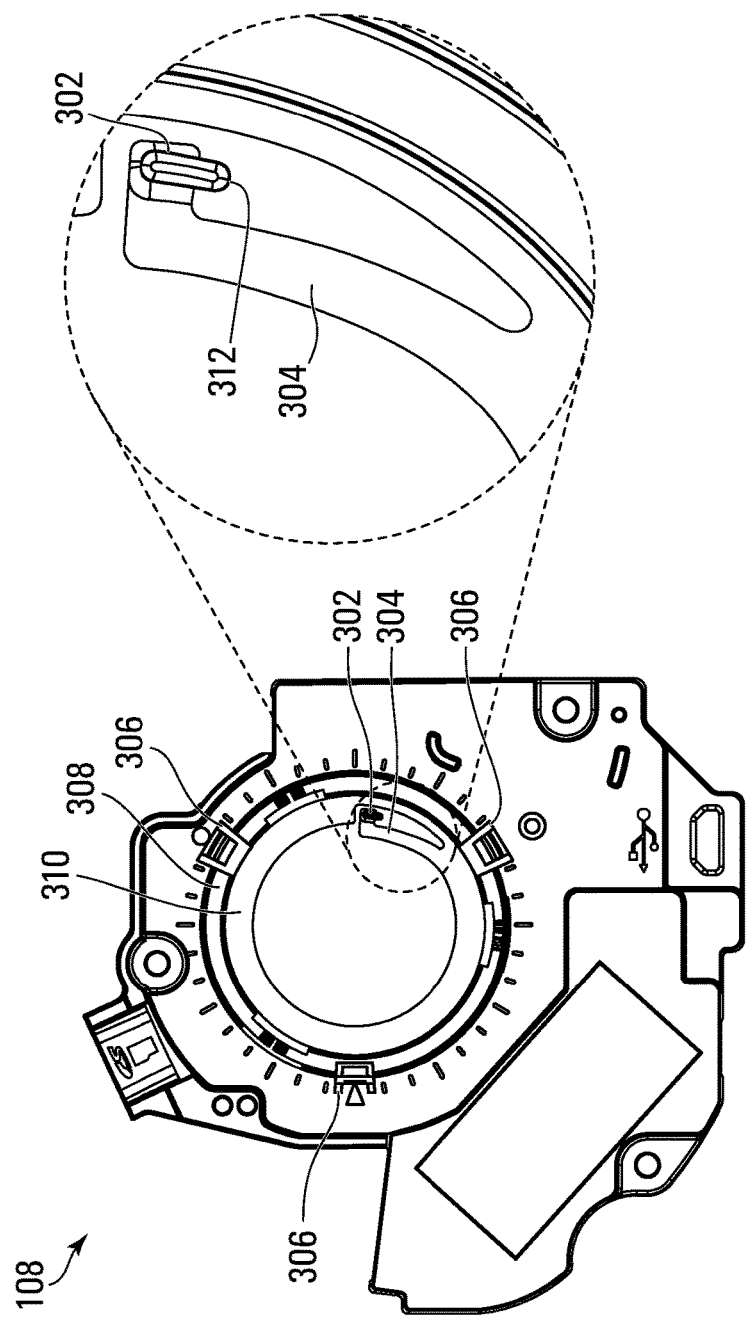
FIG. 3 illustrates a top plan view of the gimbal base according to one example embodiment.

Referring now to FIG. 3, illustrated therein is a top plan view of the gimbal base 108 according to one example embodiment. The gimbal base 108 comprises a first ring 308 and a second ring 310 for receiving the yoke 110, snaps 306 for retaining the Yoke 110 in the first ring 308 and the second ring 310, and a guide 304. The guide 304 is a cantilever arm which is molded such that it largely follows the shape of the second ring 310 (hole through the base), but is offset along the length towards the center of the hole. At the end of the cantilever arm, there is a pin 302 that extends above the surface to act as a stop to limit the pan rotation of the yoke 110. Optionally, there is a protrusion 312 to the pin 302 pointing back towards the root of the cantilever.

Figure 4:
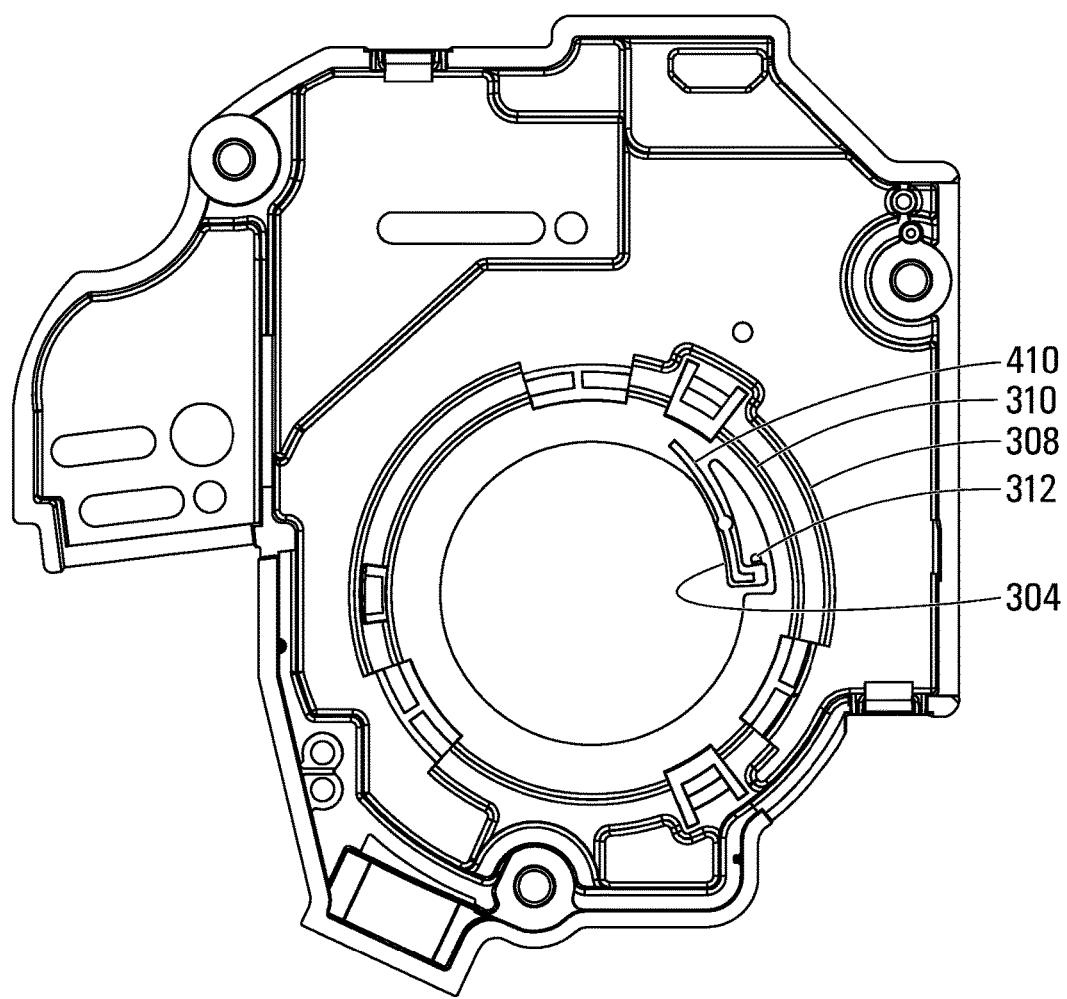
FIG. 4 illustrates a bottom plan view of the gimbal base according to one example embodiment.

Referring now to FIG. 4, illustrated therein is a bottom plan view of the gimbal base 108 according to one example embodiment. As shown the guide 304 has a rib 410 to further strengthen the cantilever arm.

Figure 5:
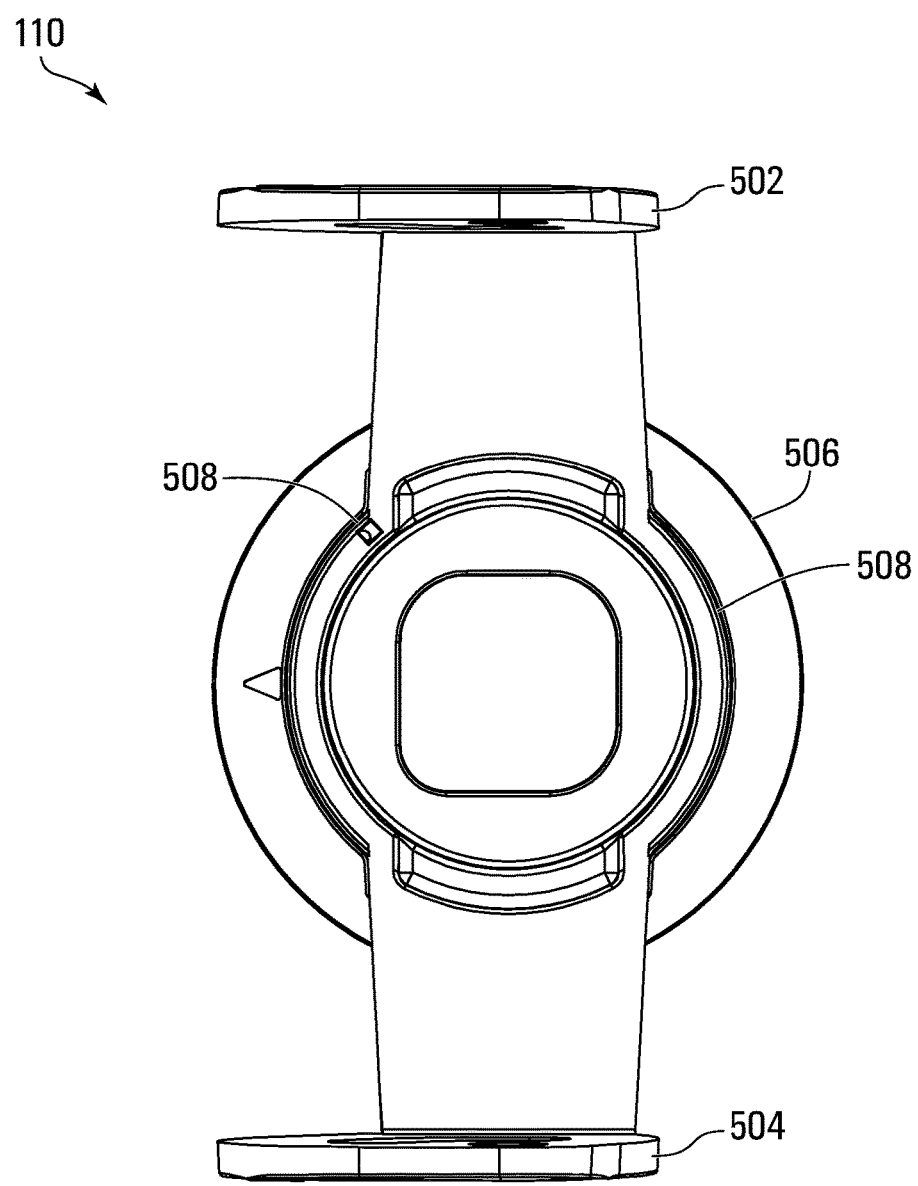
FIG. 5 illustrates a top plan view of the yoke according to one example embodiment.

Referring now to FIG. 5, illustrated therein is a top plan view of the yoke 110 according to one example embodiment. The yoke 110 comprising a first arm 502, a second arm 504, a stop disk 508, and a seating disk 506. The seating disk 506 fits into the first ring 308 of the gimbal base 108. Both the seating disk 506 and the first ring 308 are circular so that the yoke 110 can pan rotate relative to the gimbal base 108.

Figure 6:
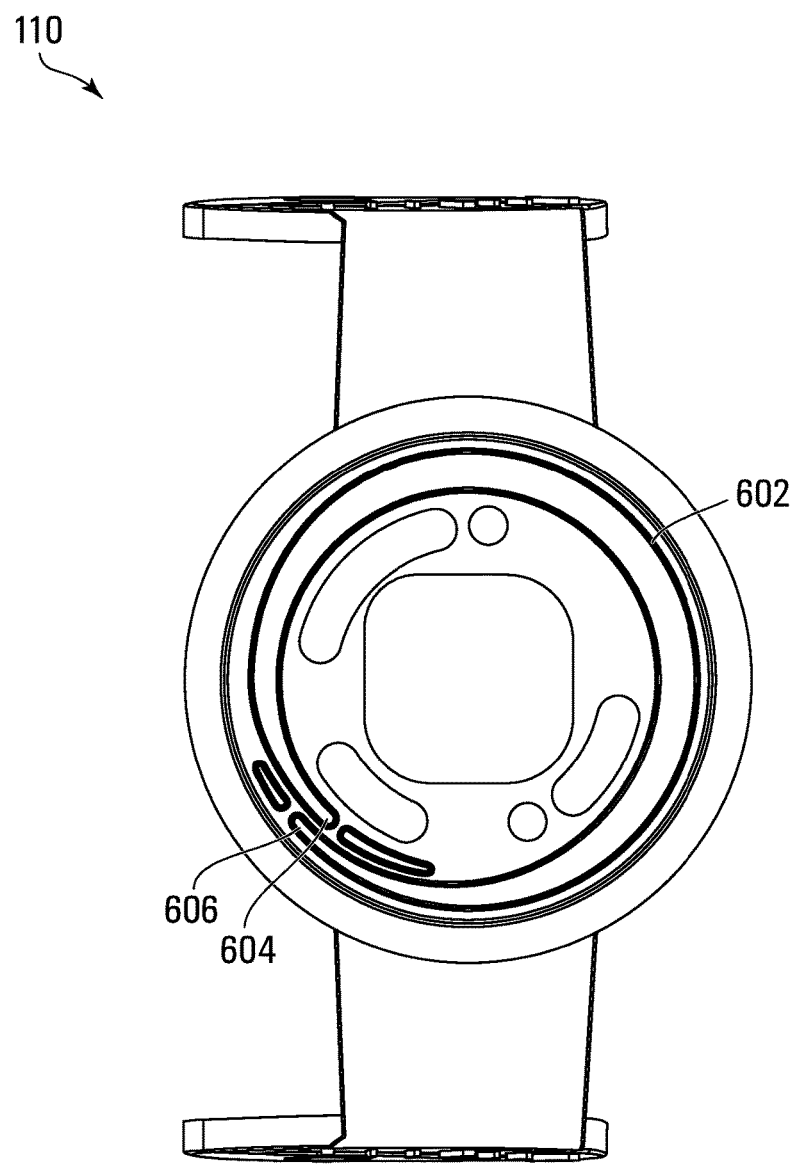
FIG. 6 illustrates a bottom plan view of the yoke according to one example embodiment.

Referring now to FIG. 6, illustrated therein is a bottom plan view of the yoke 110 according to one example embodiment. The yoke 110 comprising a track 602 with a first stop 604 and a second stop 606. The track 602 has a spiral shape. The track 602 in combination with the guide 304 allows the yoke 110 to pan rotate over 360 degrees but less than 380 degrees.

Figure 7:
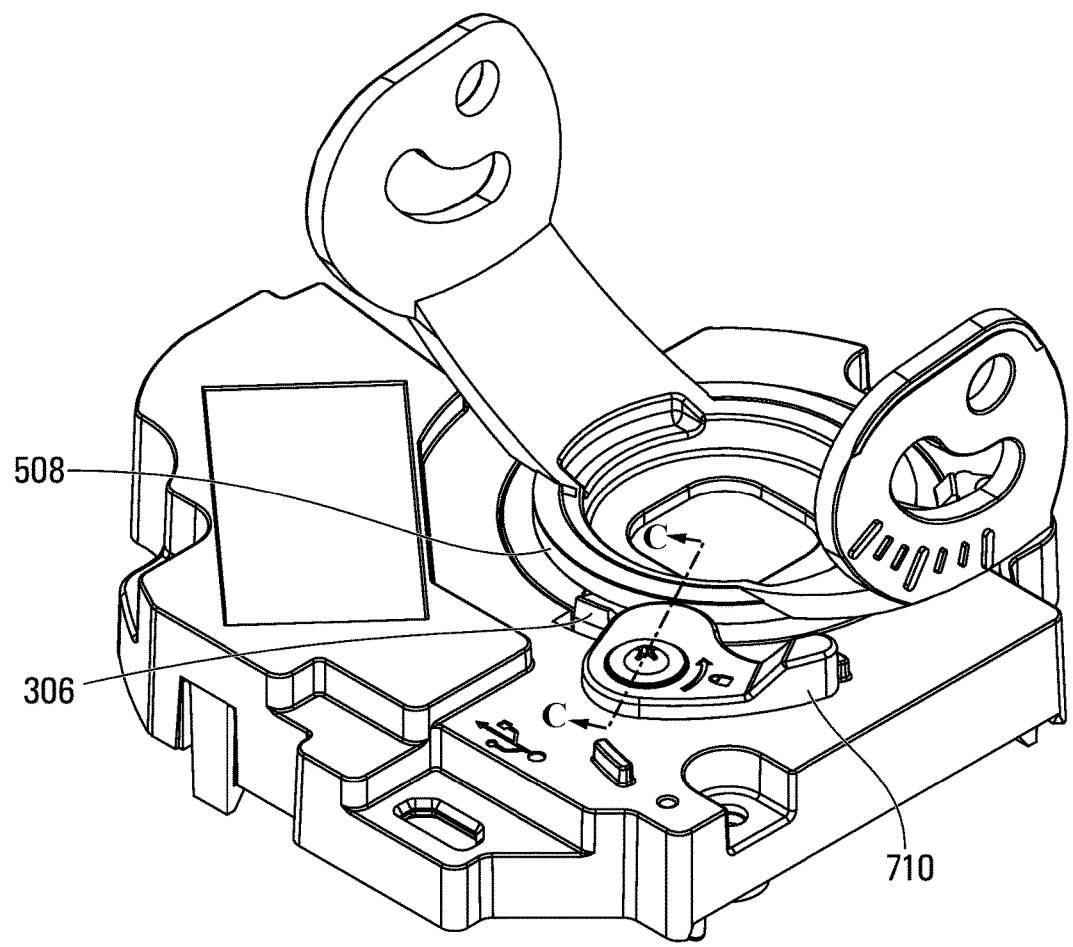
FIG. 7 illustrates a perspective view of the yoke seated on the gimbal base according to one example embodiment.

Referring now to FIG. 7, illustrated therein is a perspective view of the yoke 110 seated on the gimbal base 108 according to one example embodiment. The yoke 110 is attached to the gimbal base 108 by the snaps 306 and a cam latch 710 is engaged to the stop disk 508 to lock and prevent the yoke 110 from further pan rotation. Alternately, the cam latch 710 may instead engage the seating disk 502 (not shown) to lock and prevent the yoke 110 from further pan rotation.

Figure 8:
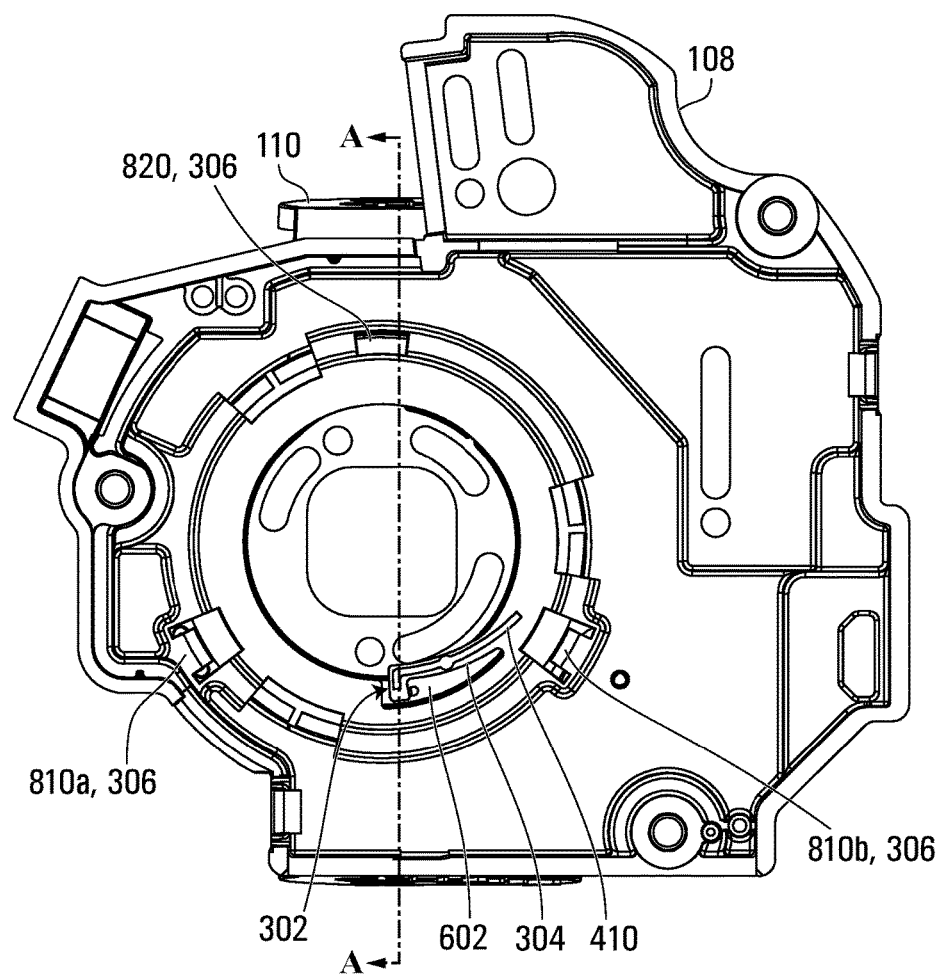
FIG. 8 illustrates a bottom plan view of the yoke seated on the gimbal base according to one example embodiment.

Referring now to FIG. 8, illustrated therein is a bottom plan view of the yoke 110 seated on the gimbal base 108 according to one example embodiment. The guide 304 has the pin 302 (not completely visible) in the track 602. The snaps 306 comprises flexible snaps 810a, 810b and fixed snap 820. Alternately, the gimbal base 108 may have two fixed snaps and one flexible snap or three flexible snaps.

Figure 9:
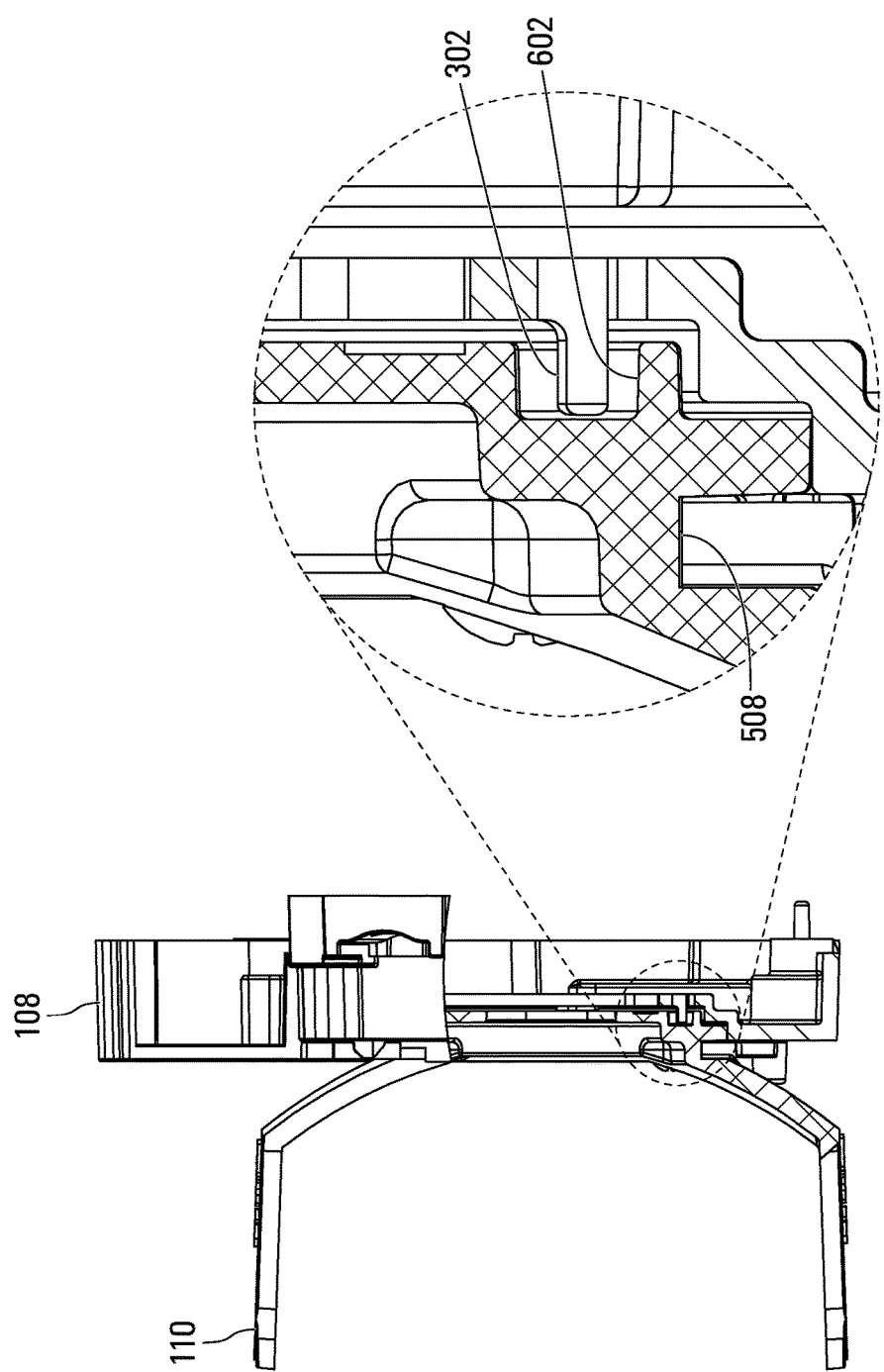
FIG. 9 illustrates a sectional view of the yoke seated on the gimbal base according to one example embodiment.

Referring now to FIG. 9, illustrated therein is a sectional view of the yoke 110 seated on the gimbal base 108 along line A-A of FIG. 8 according to one example embodiment. The yoke 110 is attached to the gimbal base 108 through the use of the snaps 306, and the pin 302 on the gimbal base 108 extends upwards into the track 602 on the yoke 110. The track 602 allows the pin 302 to pass unimpeded while the yoke 110 is rotated for the majority of the permitted pan rotation. Near the ends of the track 602, it is tapered and offset and forces the cantilever arm of the guide 304 to bend laterally and follow the wall of the track 602 until the pin 302 contacts one of the ends of the track 602, one of the first stop 604 and the second stop 606, preventing further pan rotation.

Due to the cantilever arm of the guide 304, stopping rotation of the yoke 110 is stronger in one direction where the cantilever arm is in compression. In the other direction, the cantilever arm is in extension and naturally tries to lift out of the track 602 without stopping the rotation. The rib 410 (protrusion) was added to the pin 302 which fits in the undercut molded into the yoke 110. Once interlocked, the cantilever arm is prevented from lifting, allowing the stopping to be effective in the other rotation direction.

Figure 10:
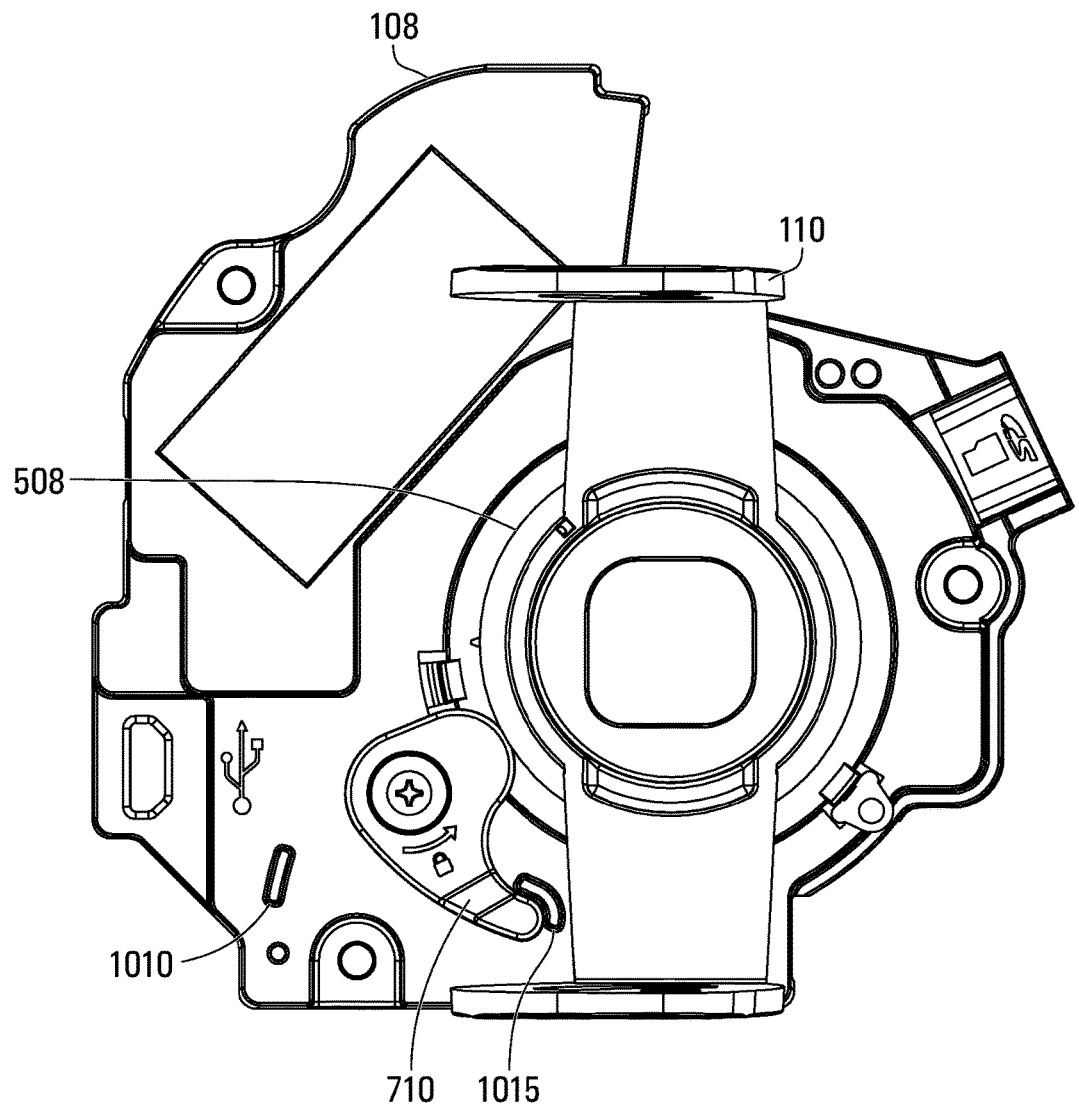
FIG. 10 illustrates a top plan view of the yoke seated on the gimbal base and the cam latch engaged with the yoke according to one example embodiment.

Referring now to FIG. 10, illustrated therein is a top plan view of the yoke 110 seated on the gimbal base 108 and the cam latch 710 engaged with the yoke 110 according to one example embodiment. As shown, the cam latch 710 is engaged with the stop disk 508 in a locked position at lock tap 1015. At or before the cam latch 710 reaching tap 1010, the yoke 110 is unlocked to be able to pan rotate relative to the gimbal base 108.

Figure 11:
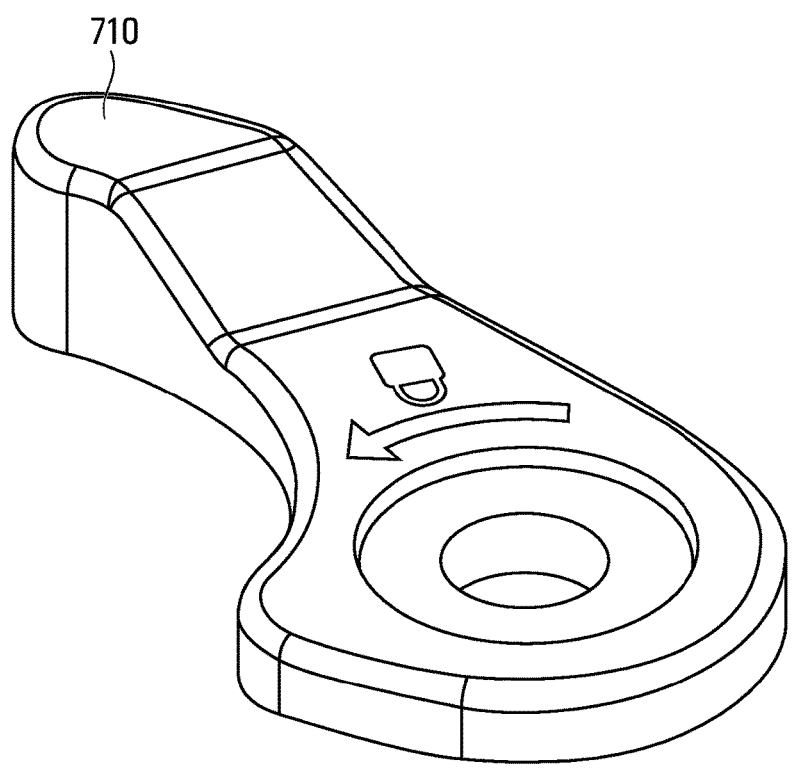
FIG. 11 illustrates a perspective view of the cam latch according to one example and another example embodiment.

Referring now to FIG. 11, illustrated therein is a perspective view of the cam latch 710 according to one example embodiment.

Figure 12:
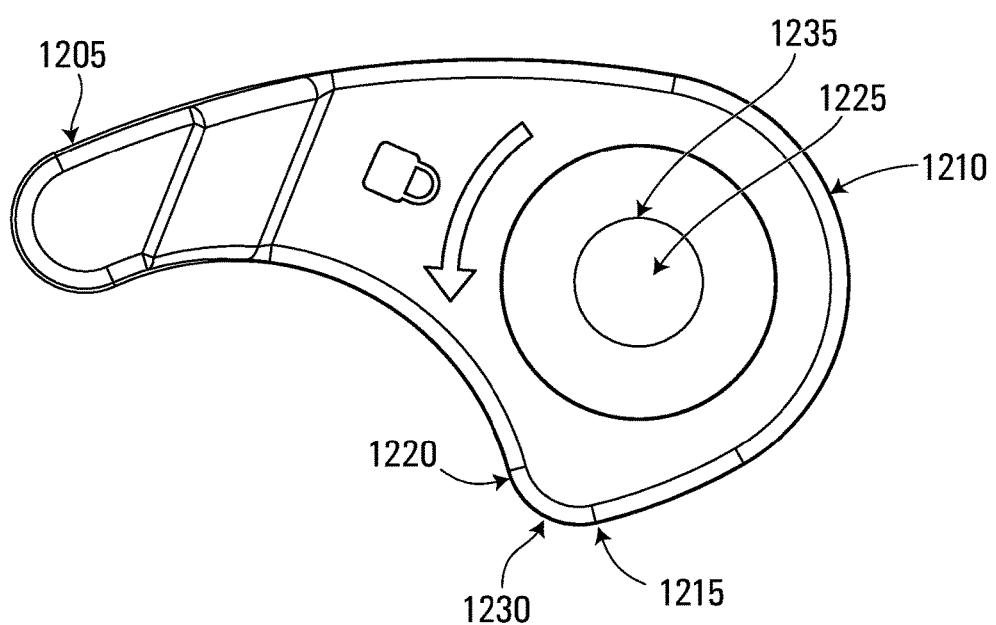
FIG. 12 illustrates a top plan view of the cam latch of FIG. 11.

Referring now to FIG. 12, illustrated therein is a top plan view of the cam latch 710. The cam latch 710 comprises a handle 1205, a first reduced curve portion 1210, an increased curve portion 1215, a max curve portion 1230, and a second reduced curve portion 1220. The reduced portion 1210 has a surface that is closer to an attachment axis 1225. The increased curve portion 1215 has a surface that is further from the attachment axis 1225 then the surface of the reduced portion 1210. The max curve portion 1230 has a surface that is farthest from the attachment axis 1225 as compared to the first reduced curve portion 1210, the increased curve portion 1215, and the second curve portion 1220. The second curve portion 1220 is just a little bit closer to the attachment axis 1225 then the max curve portion 1230. The attachment axis 1225 is the center of hole 1235 which is used to attach the cam latch 710 to the gimbal base 108 with a fastener such as a screw.

Figure 13:
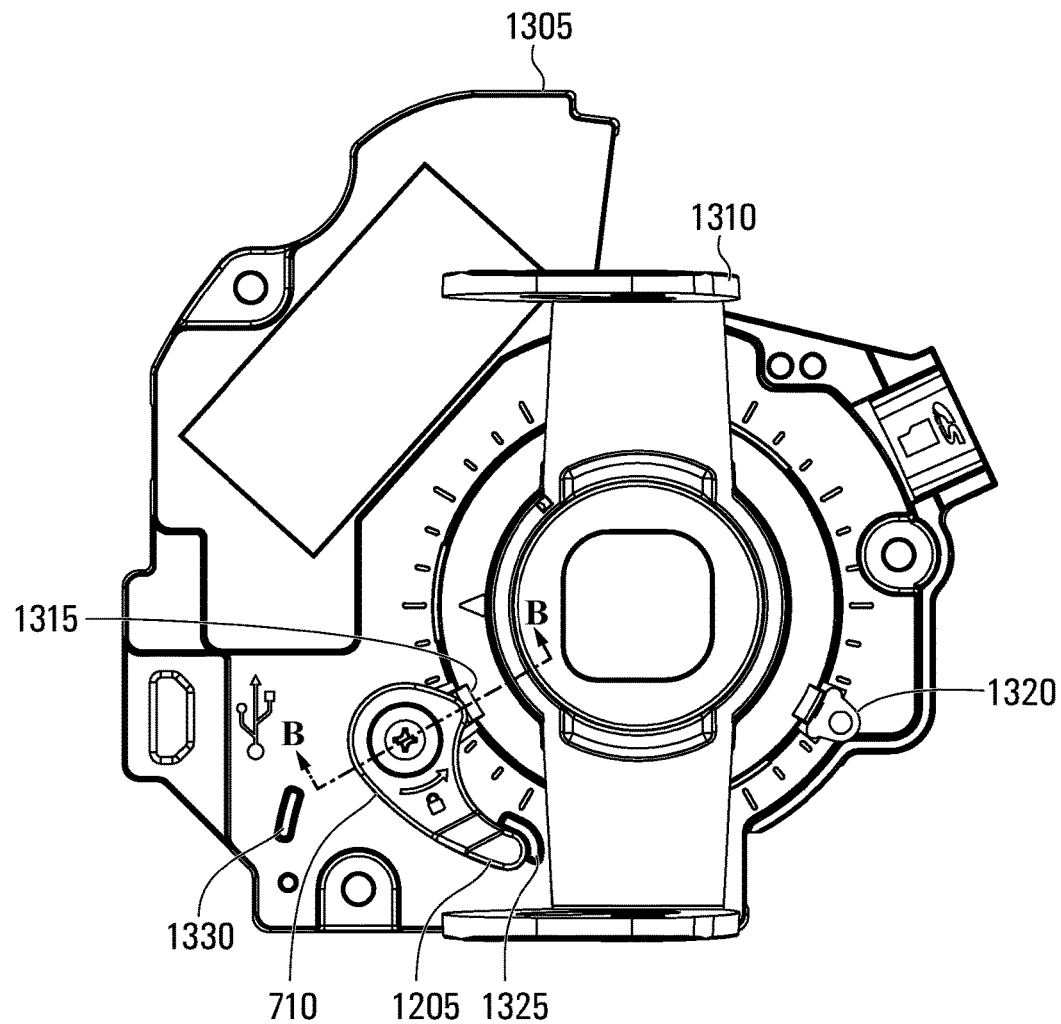
FIG. 13 illustrates a top plan view of a yoke seated on a gimbal base according to another example embodiment.

Referring now to FIG. 13, illustrated therein is a top plan view of a gimbal base 1305 according to an alternate embodiment. The cam latch 710 is positioned to engage flexible snap 1315 when the handle 1205 is at or near locked tab 1325. The cam latch 710 contains a curved surface that increases the distance from the attachment axis 1225 as the cam latch 710 is rotated from the first reduced curve portion 1210 to the increased curve portion 1215 relative to the snap 1315. On or before the max curve portion 1230 engages the snap 1315, that is the cam latch 710 makes contact with the snap 1315 and pushes against the snap 1315 towards yoke 1310, thereby creating friction between the snap 1315 and the yoke 1310 to prevent further rotation of the yoke 1310. As shown, the cam latch 710 is in a locked position where the handle 1205 is at lock tab 1325, and the cam latch 710 has been rotated past the max curve portion 1230 to the second curve portion 1220. With the second curve portion 1220 engaging the snap 1315, the handle 1205 would resist movement to the unlock tab 1330.

The handle 1205 provides a pushing surface for a user to rotate the cam latch 710. There are one or more fixed snaps 1320 (not all shown) to retain the yoke 1310 in the gimbal base 1305.

Figure 14:
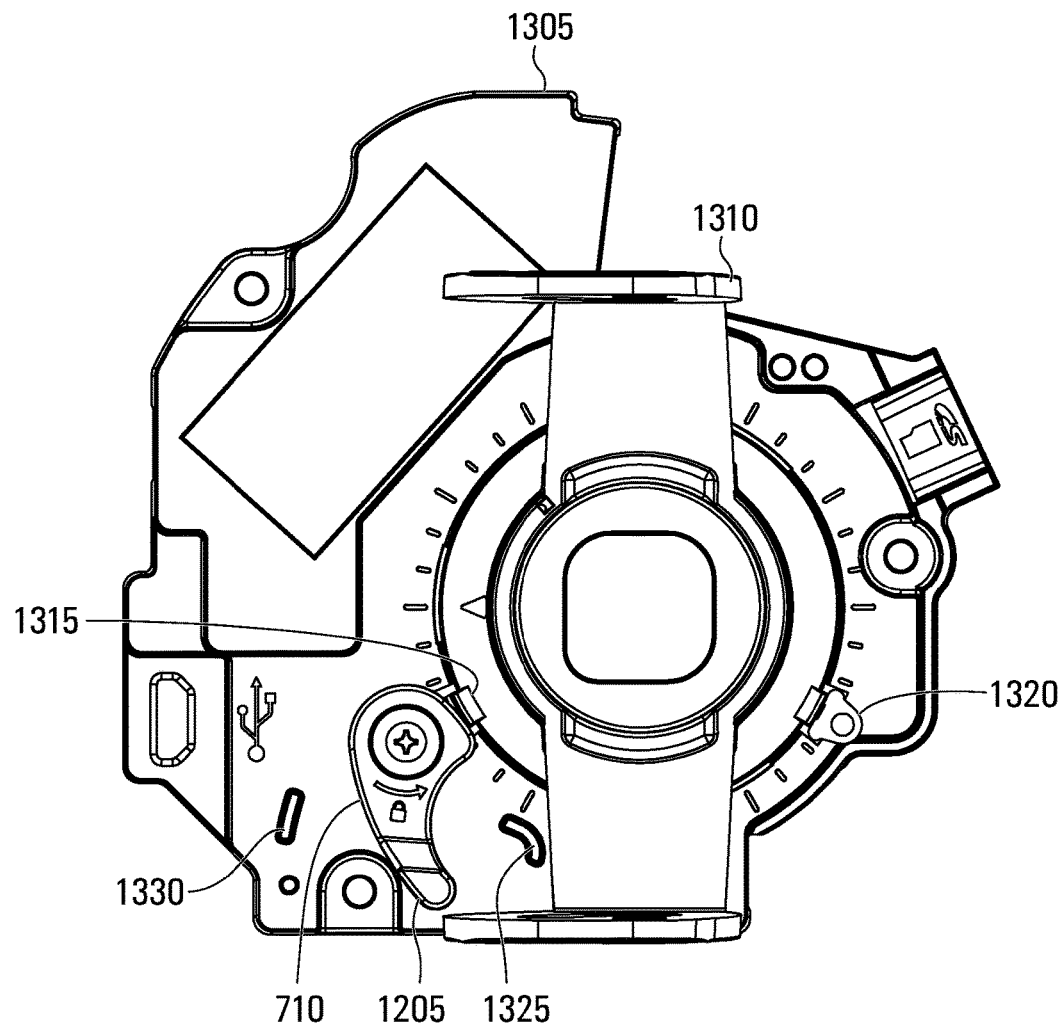
FIG. 14 illustrates a top plan view of the yoke seated in the gimbal base of FIG. 13.

Referring now to FIG. 14, illustrated therein is a top plan view of the yoke 1310 seated in the gimbal base 1305 of FIG. 13 with the cam latch 710 released from the locked position. The cam latch 710 is in a unlocked position when the handle 1205 reaches unlock tab 1330.

Figure 15:
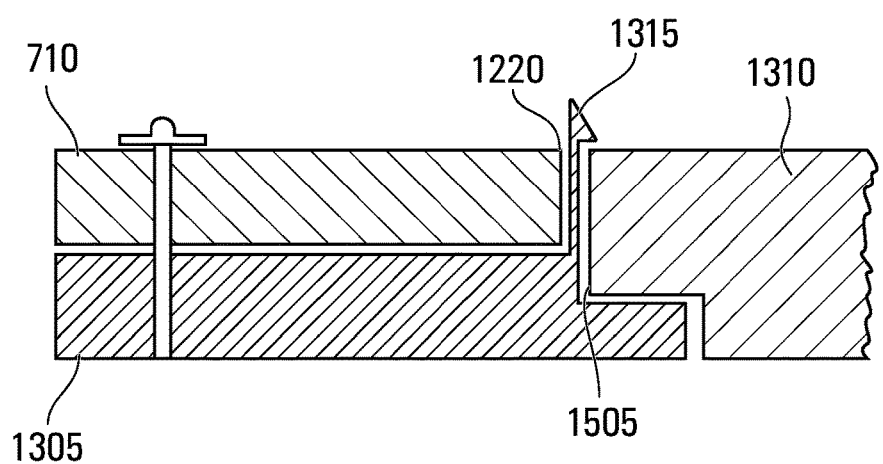
FIG. 15 illustrates a sectional view of line B-B of FIG. 13.

Referring now to FIG. 15, illustrated therein is a sectional view of line B-B of FIG. 13 showing the cam latch 710 in the locked position with the second curve portion 1220 engaged against the snap 1315 which pushes the snap 1315 against the yoke 1310. The pressure of the snap 1315 against the yoke 1310 creates the friction between the yoke 1310 and the gimbal base 1305 to prevent further rotation between these parts. Alternately, the cam latch 710 may instead directly engage seating disk 1505 of the yoke 1310 (not shown with the snap 1315 removed) to create the friction between the yoke 1310 and the gimbal base 1305 to prevent further rotation between these parts.

Figure 16:
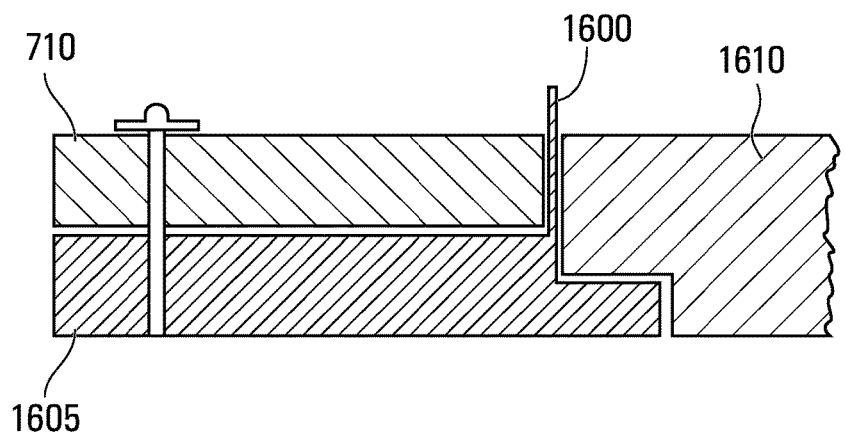
FIG. 16 illustrates a sectional view similar to FIG. 15.

It will be understood by those of ordinary skill in the art that the snap 1315 does not have to be able to also retain the yoke 1310 in the gimbal base 1305. The snap 1315 may instead be just a tab of material 1600 as shown in FIG. 16 which illustrates a sectional view similar to FIG. 15 with the cam latch 710, yoke 1610, and gimbal base 1605.

It will be understood by those of ordinary skill in the art that the tab of material 1600 and the snap 1315 may alternatively both be present.

Figure 17:
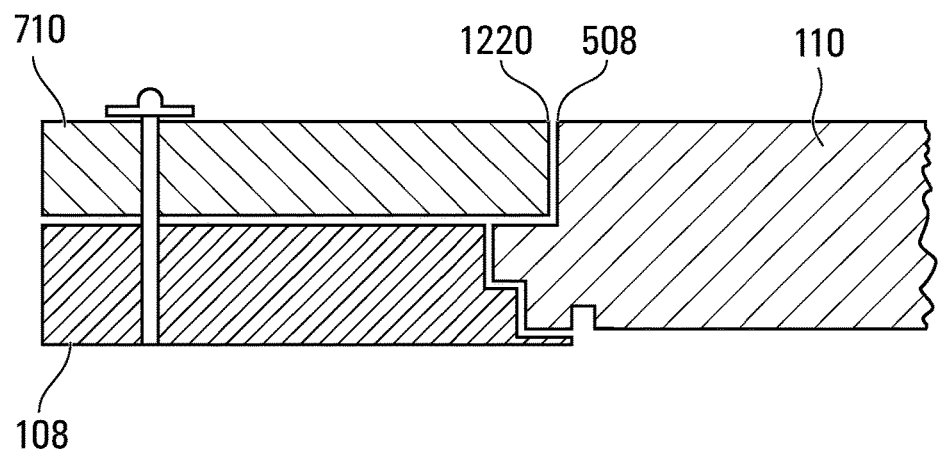
FIG. 17 illustrates a sectional view of line C-C of FIG. 7.

Referring now to FIG. 17, illustrated therein is a sectional view of line C-C of FIG. 7. The cam latch 710 is in a locked position where the second curve portion 1220 engages and pushes against the stop disk 508 thereby creating friction which prevents further rotation between the gimbal base 108 and the yoke 110. It will be appreciated that the one example embodiment has a similar unlocked position and released from locked position for the cam latch 710 as the alternate embodiment as shown in FIG. 14.

It will be understood by those of ordinary skill in the art that the embodiments described herein may be practiced without these specific details. This description is not to be considered as limiting the scope of the embodiments described herein in any way but rather as merely describing the implementation of the various embodiments described herein. For example, the embodiments described herein have the track on the yoke and the guide on the gimbal base. It will be understood by those of ordinary skill in the art that instead the guide may be implemented on the yoke and the track may be implemented on the gimbal base.

The yoke 110, 1310, the gimbal base 108, 1305, the cam latch 710 may be substantially constructed of a flexible material such, for example, a plastic. The yoke 110, 1310 may be constructed from, for example, polyoxymethylene;

the gimbal base 108, 1305 may be constructed from, for example, polycarbonate; and the cam latch 710 may be constructed from, for example, polycarbonate. It will be understood by those of ordinary skill in the art that the yoke, the gimbal base, and the cam latch may also be constructed using a metal, for example.

Figure 18:
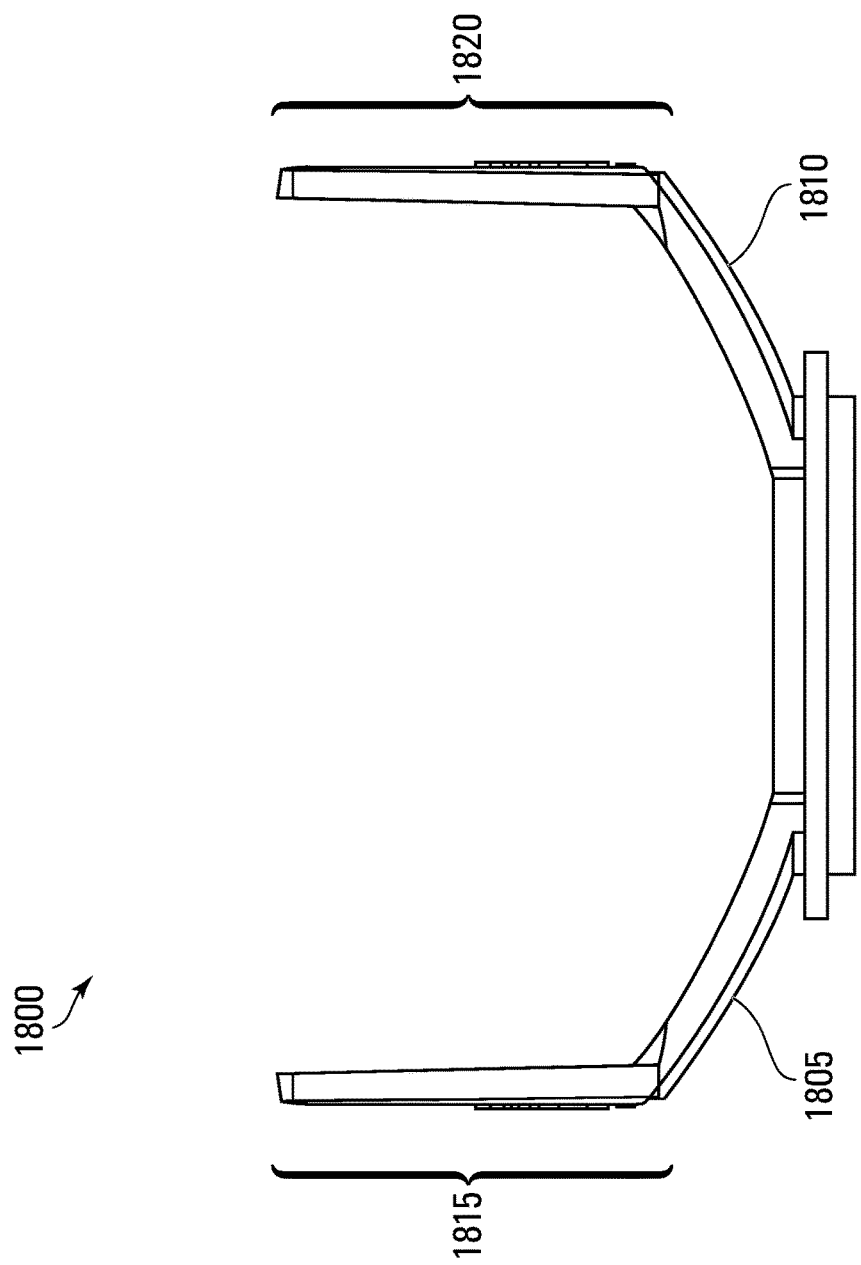
FIG. 18 illustrates a front plan view of a yoke according to a further example embodiment.
Figure 19:
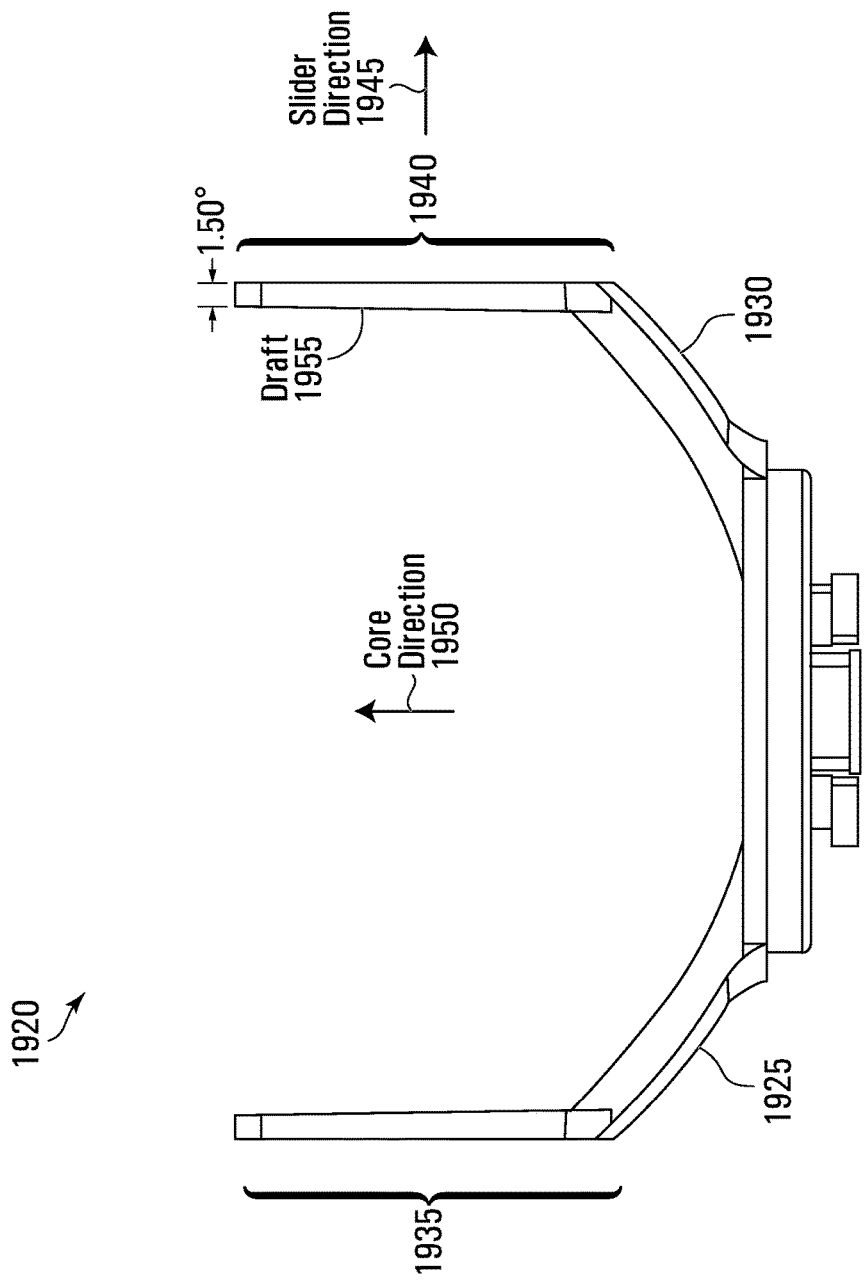
FIG. 19 illustrates a front plan view of a yoke according to the prior art.

Referring now to FIG. 18, illustrated therein is a front view of a yoke 1800 according to another example embodiment. The yoke 1800 and the yoke 110 shown in FIG. 1 are a functionally interchangeable part for the dome camera 100 of FIG. 1. The yoke 1800 includes a first arm 1805 and a second arm 1810. The first arm 1805 has a first draft surface 1815 and the second arm 1810 has a second draft surface 1820. The draft surfaces 1815, 1820 have a uniform thickness. This provides an even clamping thickness for the locking thumb screw 120 (FIG. 1) over the entire adjustment range thus providing a consistent clamping force in both directions. Further, the draft surfaces 1815, 1820 are angled slightly outward from the vertical (in the slider direction) in order for the yoke 1800 may be easily removed from the molding tool. This alleviates the clamping problem of the non-uniform thickness while at the same time allowing the yoke 1800 to be easily removed from the molding tool.

Those skilled in art may determine the thickness of the draft surfaces 1815, 1820 and the dimensions of the yoke 1800 so that when the screw bosses 118 are installed with the optical module 112, the arms 1805, 1810 are deformed such that both the inside and exterior surfaces of the draft surfaces 1815, 1820 are vertical and parallel. Due to this deformation, the size of the pass-through on the slider need to be adjusted as the clearance of these features will be at an angle relative to the optical module 112 bosses once assembled.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A gimbal pan assembly for locking an optical module of a dome camera in a pan direction, the gimbal pan assembly comprising:
    a yoke configured to mount the optical module, the yoke including a disk;
    a gimbal base configured to:
        mount the yoke; and
        allow the yoke to pan rotate; and
    a cam latch mounted on the gimbal base and configured to push against the disk to create friction to lock the yoke from pan rotating.

2. The gimbal pan assembly of claim 1, wherein the disk is a seating disk.

3. The gimbal pan assembly of claim 1, wherein the disk is a stop disk.

4. The gimbal pan assembly of claim 1, wherein the cam latch has a max curve portion.

5. The gimbal pan assembly of claim 4, wherein the cam latch has a second curved portion.

6. The gimbal pan assembly of claim 5, wherein the cam latch has a first curved portion.

7. A gimbal pan assembly for locking an optical module of a dome camera in a pan direction, the gimbal pan assembly comprising:
    a yoke configured to mount the optical module, the yoke including a disk;
    a gimbal base having a tab and configured to:
        mount the yoke; and
        allow the yoke to pan rotate; and
    a cam latch mounted on the gimbal base and configured to push the tab against the disk to create friction to lock the yoke from pan rotating.

8. The gimbal pan assembly of claim 7, wherein the disk is a seating disk.

9. The gimbal pan assembly of claim 7, wherein the disk is a stop disk.

10. The gimbal pan assembly of claim 7, wherein the cam latch has a max curve portion.

11. The gimbal pan assembly of claim 10, wherein the cam latch has a second curved portion.

12. The gimbal pan assembly of claim 11, wherein the cam latch has a first curved portion.

* * * * *